United States Patent [19]

Hayashi et al.

[11] Patent Number: 5,517,757
[45] Date of Patent: May 21, 1996

[54] METHOD OF MANUFACTURING A STACKED HEAT EXCHANGER

[75] Inventors: Masateru Hayashi; Hiroshi Iokawa, both of Nishi-biwajima; Shigeo Sakai, Nagoya, all of Japan

[73] Assignee: Mitsubishi Jukogyo Kabushiki Kaisha, Tokyo, Japan

[21] Appl. No.: 293,758

[22] Filed: Aug. 22, 1994

Related U.S. Application Data

[62] Division of Ser. No. 112,424, Aug. 25, 1993, Pat. No. 5,417,280.

[30] Foreign Application Priority Data

Aug. 27, 1992 [JP] Japan .................................. 4-228230

[51] Int. Cl.$^6$ ...................................................... B23P 15/26
[52] U.S. Cl. .............................. 29/890.039; 29/890.054; 165/153
[58] Field of Search ........................ 29/890.039, 890.054; 165/153; 228/183

[56] References Cited

U.S. PATENT DOCUMENTS 5,125,453   6/1992   Bertrand et al. ........................ 165/153

FOREIGN PATENT DOCUMENTS

3606253A1   11/1986   Germany .

Primary Examiner—Irene Cuda
Attorney, Agent, or Firm—Arnold, White & Durkee

[57] ABSTRACT

A stacked heat exchanger includes separate flow paths 54 and 55 which are formed by corrugated inner fins 52 and 53, disposed in chambers 48 and 49 of a flat tube 41, and also separate U-shaped flow paths 56 are formed at the U-turn portion 50 to make the flow of refrigerant smooth, increase the area of flow paths, and eliminate the stagnation of refrigerant at the U-turn portion 50. The separation of refrigerant into two phases of gas and liquid due to centrifugal forces at the U-turn portion 50 is limited to the inside of each divided U-shaped flow path 56, thereby the distribution of the gas and liquid phases can be decreased. Also disclosed is a method of manufacturing a stacked heat exchanger, in which the reliability of flat tube 41 is improved, and the leakage of refrigerant is prevented.

2 Claims, 20 Drawing Sheets

F I G. 16
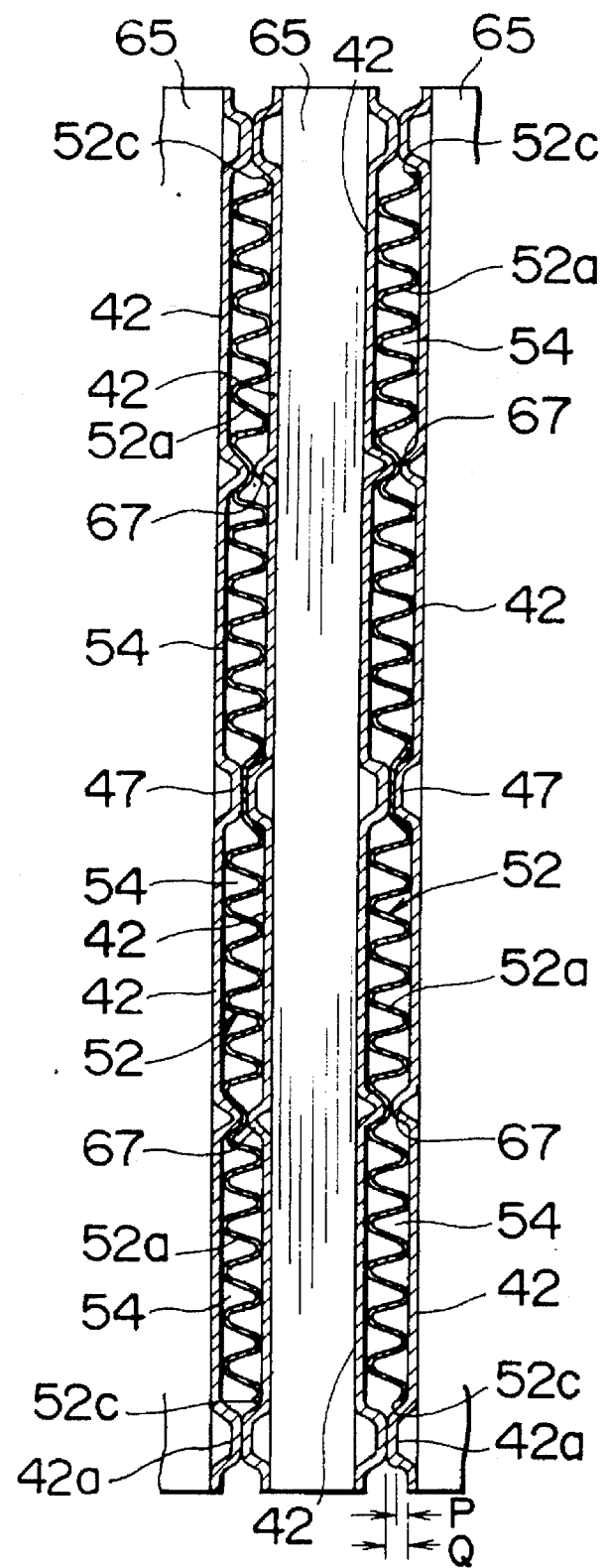

FIG. 20
RELATED ART
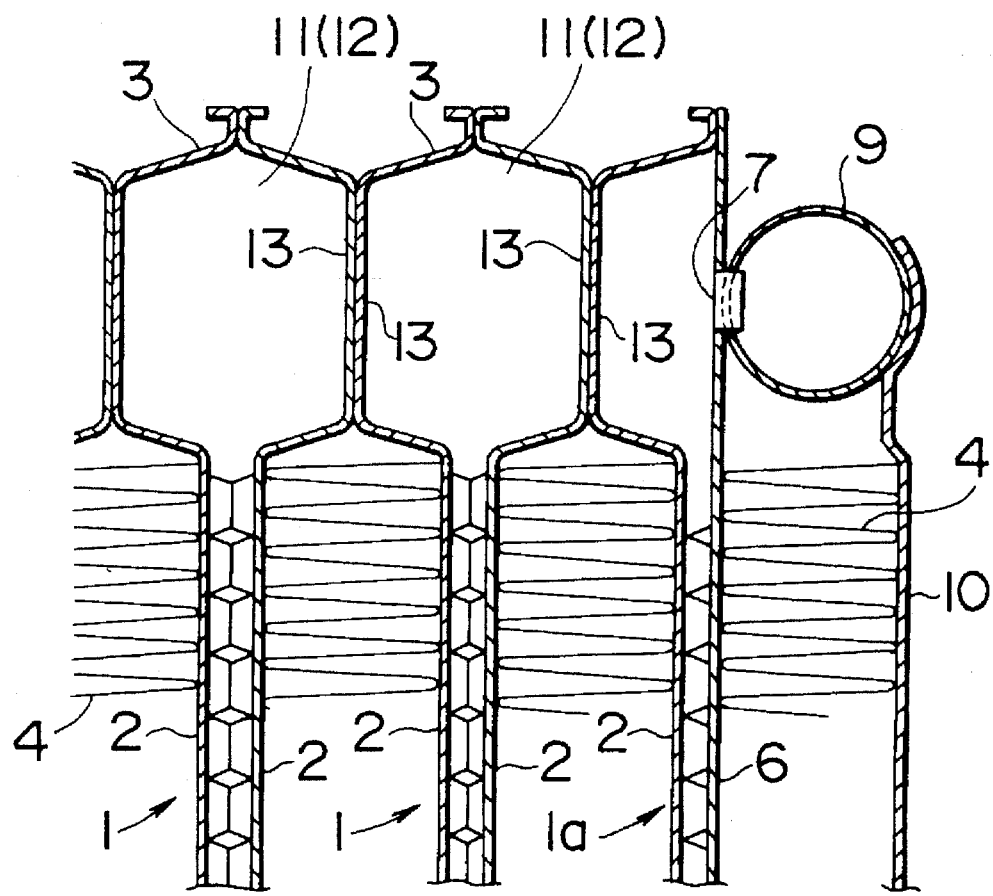
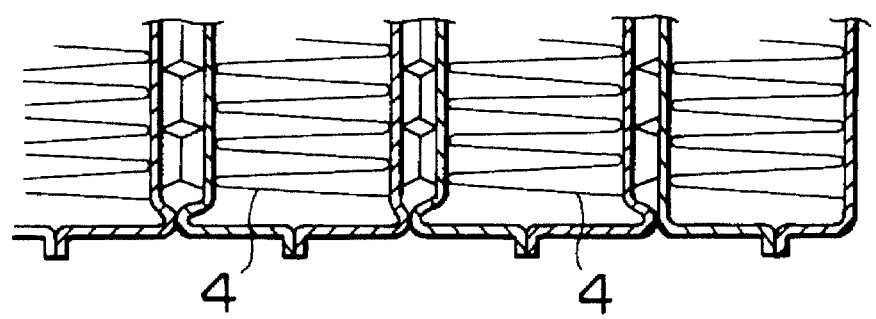

FIG. 21
RELATED ART
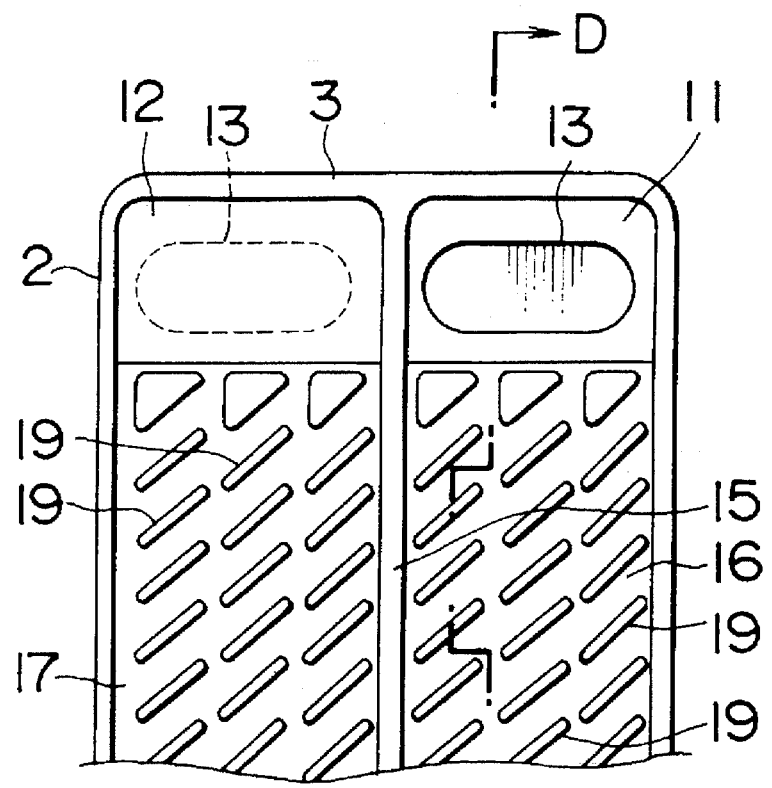
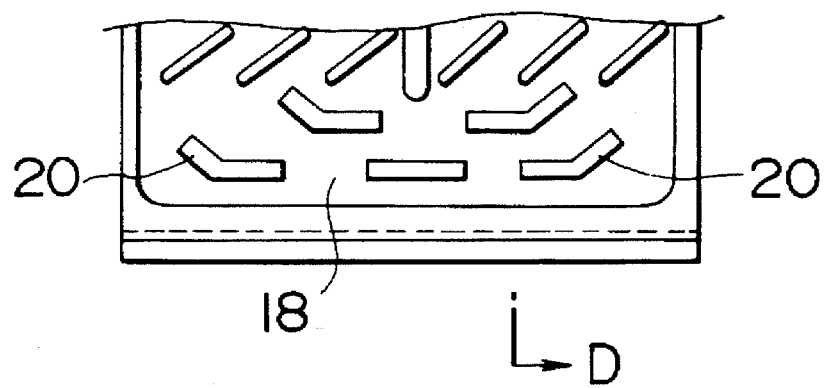

FIG. 22
RELATED ART
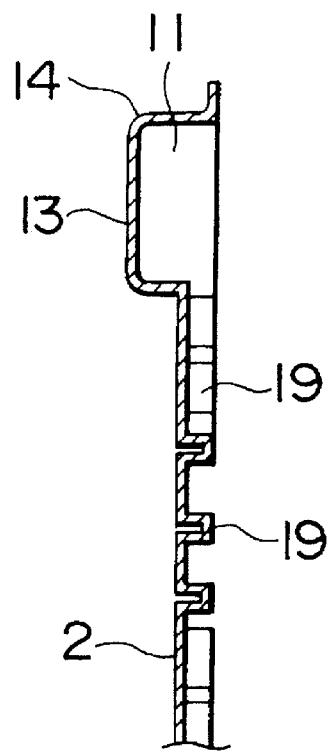
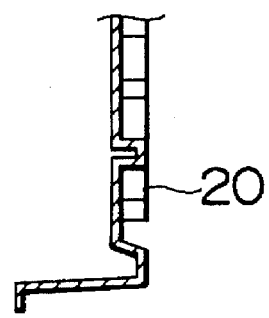

METHOD OF MANUFACTURING A STACKED HEAT EXCHANGER

This is a divisional of application Ser. No. 08/112,424, filed on Aug. 25, 1993 now U.S. Pat. No. 5,417,280.

BACKGROUND OF THE INVENTION

1. Field of the Invention

The present invention relates to a stacked heat exchanger which can be used as an evaporator of an air conditioner, particularly suitable as an evaporator in automotive air conditioners, and a method of manufacturing the same.

2. Description of the Related Art

A conventional stacked heat exchanger will be described with reference to FIGS. 19 and 20. FIG. 19 is a front view of a conventional stacked heat exchanger, and FIG. 20 is an expanded cross-sectional view of its right side portion.

Referring to FIGS. 19 and 20, reference numeral 1 denotes a flat tube. It is formed of two press-formed plates 2 which are butted together. An inlet/outlet tank portion 3 is formed at one end (upper end in the figure) of the flat tube 1.

A stacked heat exchanger (evaporator) 5 is constructed by alternately putting flat tubes 1 and corrugated fins 4 together and connecting the inlet/outlet tanks 3.

The outside of the flat tube 1a located at each end of the heat exchanger constitutes an end plate 6, and the end plate is provided with a through hole 7 at the inlet/outlet tank portion 3. The through hole 7 at one end is connected to an inlet pipe 8 for the refrigerant, while the through hole 7 at the other end is connected to an outlet pipe 9 for the refrigerant.

The inlet and outlet pipes 8, 9 are fixed to the end plate 6 by brazing. Between the side plate 10 and the end plate 6 are provided corrugated fins 4.

The inlet/outlet tank portion 3 is partitioned into an inlet portion 11 and an outlet portion 12 in the panel width direction of the flat tube 1. When the evaporator 5 is constructed, the inlet portions 11 of the adjacent inlet/outlet tank portions, as well as the outlet portions 12 thereof, communicate with each other through communicating holes 13.

The flat tube 1 will be described with reference to FIGS. 21 and 22. FIG. 21 is a front view of a plate 2 forming the flat tube 1, and FIG. 22 is a cross-sectional view taken along the line D—D of FIG. 21.

The upper end portion of the plate 2 is provided with an expanded portion 14 for forming the inlet/outlet tank portion 3. The hollow portion of the plate 2 is divided into two chambers 16 and 17 by a partition 15 extending vertically at the center. The lower end portion of the partition 15 is cut short and does not reach the bottom of the plate 2, so that the lower end of the plate 2 can constitute a U-turn portion 18 for allowing the U-turn of refrigerant. By butting two plates 2 together, the inlet/outlet tank portion 3 is divided into the inlet portion 11 and the outlet portion 12 by the partition 15, and at the same time the flat tube is divided into the chamber 16 communicating with the inlet portion 11 and the chamber 17 communicating with the outlet portion 12. Further, the chamber 16 communicates with the chamber 17 at the U-turn portion 18. Thus, the chambers 16 and 17 and the U-turn portion 18 form a fluid passage.

In the chambers 16 and 17, many ribs protrude, so that the inside of the chambers 16 and 17 is fractionized like a maze. At the U-turn portion 18, guide ribs 20 protrude, so that the U-turn flow of refrigerant is guided from the chamber 16 to the chamber 17 by the guide ribs 20.

Next, the flow of refrigerant in the above-described evaporator 5 will be described with reference to FIG. 23. FIG. 23 shows the flow of refrigerant.

The evaporator 5 is broadly divided into three groups 21, 22, and 23. The arrangements of the inlet portion 11 and the outlet portion 12 of the groups 21 and 23 connected to the inlet pipe 8 and the outlet pipe 9, respectively, are the same, but the arrangement of the inlet portion 11 and the outlet portion 12 of the group 22 is reversed. For the inlet/outlet tank portion 3 opposing between the group 21 and the group 22 and between the group 22 and the group 23, the outlet portion 12 of the group 21 communicates with the inlet portion 11 of the group 22, and the outlet portion 12 of the group 22 communicates with the inlet portion 11 of the group 23. The inlet portion 11 of the group 21 is connected to the inlet pipe 8 through the through hole 7 of the end plate 6, while the outlet portion 12 of the group 23 is connected to the outlet pipe 9 through the through hole 7.

A refrigerant 31 introduced into the evaporator 5 through the inlet pipe 8 is sent from the inlet portion 11 of the group 21 to the U-turn portion 18 through the chamber 16, makes a U-turn, and is sent to the outlet portion 12 through the chamber 17. The refrigerant 31 which has been sent to the output portion 12 of the group 21 is sent to the inlet portion of the group 22, and then is sent to the group 23 after flowing in the group 22 in the same way as in the group 21. Finally, the refrigerant 31 is discharged from the outlet pipe 9 after flowing in the fluid passage (chambers 16 and 17, U-turn portion 18) of the group 23.

In this process, air 32 is sent to between the corrugated fins 4, so that the air 32 is cooled by using the latent heat of evaporation of the refrigerant 31.

For the above-described evaporator 5, the corrugated fins 4 are disposed between the plates 2 and stacked. The stacked corrugated fins are joined integrally by brazing.

In the above-described conventional evaporator 5, many ribs 19 are installed in the chambers 16 and 17 on the inside of the plate 2 of the flat tube 1 to increase the heat transfer area for the refrigerant. However, the refrigerant sometimes does not flow smoothly because the flow paths are like a maze. Moreover, at the U-turn portion 18, though the U-turn of the refrigerant is guided by the guide ribs 20, the refrigerant is separated into two phases of gas and liquid by centrifugal-force, so that the gas and liquid cannot be distributed uniformly in the flow direction, decreasing the efficiency of heat exchange.

Also, the conventional evaporator 5 is undesirable because the entirety of the evaporator is greatly deformed under repeated pressurization when only ribs 19 are installed, as seen from the deformation mode shown in FIG. 14. Therefore, there has been anxiety in terms of strength under pressure.

The evaporator 5 has so far been manufactured so that the corrugated fins 4 are disposed between the plates 2, stacked and brazed. In this case, a high accuracy of positioning of the corrugated fins 4 with respect to the plate 2 can be maintained. However, it has been difficult to maintain a high joining accuracy of the flat tube composed of two joined plates 2, which makes the reliability of the flat tube 1 poor.

SUMMARY OF THE INVENTION

To solve the above problems, the present invention provides a stacked heat exchanger comprising flat tubes and corrugated fins which are alternately put together, wherein the flat tube is formed by butting two press-formed plates, has an inlet/outlet tank portion formed at one end thereof, and has a fluid passage formed therein for guiding a fluid flowing between the two plates from an inlet tank portion to an outlet tank portion by allowing a U-turn at the other end portion of the flat tube, wherein corrugated inner fins are inserted in the straight portion of the fluid passage between the inlet/outlet tank portion and the other end portion to divide the fluid passage into a plurality of flow paths along the lengthwise direction, and a plurality of separate U-shaped flow paths are formed at the U-turn portion of the fluid passage to allow a U-turn of fluid.

In one aspect of the present invention, the U-shaped flow paths are formed by pressing a plurality of U-shaped beads on the butt faces of the two plates.

In another aspect of the present invention, the U-shaped flow paths are formed by inserting a U-shaped corrugated inner fin which forms a plurality of separate U-shaped flow paths at the U-turn portion.

The flow paths are formed by placing in the flat tube one inner fin which integrally formed of corrugated inner fin portions and a U-shaped corrugated inner fin portion.

As described above, in the stacked heat exchanger in accordance with the present invention, a plurality of separate flow paths are formed at the straight portion of the flat tube, and a plurality of separate U-shaped flow paths are formed at the U-turn portion. Therefore, the flow of fluid becomes smooth, the flow path area can be increased, and the stagnation in the flow of fluid is eliminated at the U-turn portion. Also, the separation of refrigerant into two phases of gas and liquid due to the centrifugal force at the U-turn portion occurs only in each separate U-shaped flow path, thereby the distribution of the amount of gas and liquid of the two-phase refrigerant can be decreased. As a result, the nonuniform heat exchanged due to the stagnation of fluid is eliminated, and the decrease in thermal efficiency due to the deviation of fluid becomes less likely to occur.

Since the U-shaped flow paths at the U-turn portion of the flat tube are formed by inserting a U-shaped inner fin, the U-shaped flow paths can be finely divided, so that the flow of fluid can be closely controlled as a whole of the fluid passage. As a result, the heat transfer property can be improved.

Further, since the flow paths at the straight portion and the U-turn portion of the flat tube can also be formed continuously by means of one inner fin, the flow paths of fluid become continuous, and the flow becomes uniform. As a result, the amount of exchanged heat can be kept more uniform.

Therefore, the stacked heat exchanger in accordance with the present invention provides improved heat exchange efficiency.

In another configuration of the stacked heat exchanger in accordance of the present invention, the corrugated inner fins for forming a plurality of separate flow paths are inserted into the fluid passage between the inlet tank portion and the outlet tank portion of the flat tube, and the corrugated inner fin is formed from a blank sheet having a thickness between about 0.15 mm and 0.3 mm, convexes and concaves are formed on the inside and outside surfaces of the corrugated inner fins symmetrically with respect to the center of thickness of the inner fin, the thickness of the inner fin at the convex is about 1.5 to 2.5 times the thickness at the concave, and the pitch of the convexes or concaves is about 1 to 2.5 times the thickness of the blank sheet for the corrugated inner fin.

The pitch of the corrugations of the corrugated inner fin is 6 to 16 times the thickness of the blank sheet.

In such a stacked heat exchanger, since a plurality of separate flow paths of the flat tube are formed by the corrugated inner fins, the flow of the fluid in the flat tube is smooth, and the flow path area can be increased.

As noted above, the convexes and concaves are formed on the opposite sides of the corrugated inner fin symmetrically with respect to the center of thickness. The thickness of the inner fin at the convex is 1.5 to 2.5 times the thickness at the concave, and the pitch of the convexes or concaves is 1 to 2.5 times the thickness of the blank sheet used for the manufacture of the inner fins. Therefore, the surface area can be increased while avoiding the possibility of fractures or cracks on the corrugated inner fin.

Further, since the pitch of the corrugations of the corrugated inner fin is 6 to 16 times the thickness of the blank sheet, the compressive strength can be ensured enough when the plates and the fins are joined to form the flat tube.

Consequently, in the stacked heat exchanger in accordance with the present invention, the flow of fluid is smooth, the flow path area is maximized, and the heat exchange property is improved, while the strength of the flat tube is maintained.

Further, in the above configuration of the stacked heat exchanger in accordance with the present invention, the height of the edge portion of the corrugated inner fin can be set smaller than the press-formed depth of the fluid passage forming portion of the plate.

Since the height of the edge portion of the corrugated inner fin is smaller than the press-formed depth of the fluid passage forming portion of the plate, the edge portion of the corrugated inner fin does not come between the joint edges of the plates, or the corrugated inner fin is not shifted when two plates are butted.

Further, in the above configuration of the stacked heat exchanger in accordance with the present invention, a plurality of separate U-shaped flow paths can preferably be formed at the U-turn portion of the fluid passage to allow a U-turn of fluid, and protrusions for positioning the corrugated inner fin are press-formed at least at the U-turn portion side of the straight portion of the plate.

The protrusions can preferably be installed at such positions as to provide a predetermined gap between the end of the corrugated inner fin and the end of the U-shaped bead.

The predetermined gap can preferably be set at about 0.5 mm to 5 mm.

In the stacked heat exchanger in accordance with the present invention, protrusions are formed at least at positions close to the U-turn portion within the straight portion for positioning the corrugated inner fins, a predetermined gap can be defined between the corrugated inner fin and the U-shaped flow path. As a result, the flow of fluid is not interrupted between the flow paths formed by the corrugated inner fin and the U-shaped flow path, and an increase of parts of the flat tube where blazing is not effected can avoided, so that the flow of fluid becomes smooth and the compressive strength of the flat tube is ensured.

Further, in a configuration of the stacked heat exchanger in accordance with the present invention, the corrugated inner fins, which are shaped into a corrugated form and joined to the pair of plates at both edges, are disposed in an area within the core portion of the plate which area is far from the inlet/outlet tank portion, and a plurality of dimples formed on the pair of plates and butted with each other are provided in another area within the core portion which area is near the inlet/outlet tank portion.

In the stacked heat exchanger in accordance with the present invention, since a plurality of separate flow paths in the flat tube are formed by the corrugated inner fins, the flow of fluid is smooth, and the flow path area can be increased. Also, since the corrugated inner fins are effectively inserted by combining with the dimples formed on the plates, the reliability of strength under repeated pressurization can be further increased.

Further, the stacked heat exchanger in accordance with the present invention comprises flat tubes and corrugated fins which are alternately put together, wherein the flat tube is formed by butting two press-formed plates, and has an inlet/outlet tank portion formed at one end thereof, a U-turn portion disposed at the other end of the flat tube for allowing a U-turn of fluid flowing between the two plates from an inlet tank portion toward an outlet tank portion, and a partition wall disposed between the inlet/outlet tank portion and said U-turn portion of the flat tube so as to form two straight flow paths, wherein one corrugated inner fin which forms a plurality of separate flow paths along the lengthwise direction, and the center of which is put between the partition walls is inserted between the plates of the flat tube.

In the stacked heat exchanger in accordance with the present invention, since one corrugated inner fin is installed in the two straight flow path portions of the flat tube to form a plurality of separate flow paths, the flow of refrigerant can be made smooth and the flow path area can be increased with a small number of parts. As a result, the number of parts can be decreased, so that the manufacture of flat tube can be made easy and the cost can be lowered.

According to a first aspect of the manufacturing method for a stacked heat exchanger to solve the above problems, a method of manufacturing a stacked heat exchanger comprising flat tubes and corrugated fins which are alternately put together, wherein the flat tube are formed by butting two press-formed plates, have an inlet/outlet tank portion formed at one end thereof and have a fluid passage formed therein for guiding a fluid flowing between the two plates from an inlet tank portion to an outlet tank portion by allowing a U-turn at the other end portion of the flat tube, comprises the steps of disposing caulk fastening portions at a plurality of locations on the pair of plates; assembling one flat tube by caulk fastening the pair of plates together by means of the caulk fastening portions; putting many flat tubes and corrugated fins together alternately in a stacked state; and brazing the flat tubes and the corrugated fins in a stacked state in a furnace so as to join them together.

With the method of manufacturing a stacked heat exchanger in accordance with the present invention, since the flat tube is assembled by caulk fastening a pair of plates by means of the caulk fastening portion and the flat tubes and the corrugated fins are put together alternately, the assembly accuracy of the flat tube can be increased. Moreover, since subassembled flat tubes can be used for the assembly of the stacked heat exchanger, the total assembly time can be shortened and the cost can be lowered.

According to a second aspect of the manufacturing method for a stacked heat exchanger of the present invention, a method of manufacturing a stacked heat exchanger comprising flat tubes and corrugated fins which are alternately put together, wherein the flat tube are formed by butting two press-formed plates, have an inlet/outlet tank portion formed at one end thereof and have a fluid passage formed therein for guiding a fluid flowing between the two plates from an inlet tank portion to an outlet tank portion by allowing a U-turn at the other end portion of the flat tube, comprising the steps of disposing caulk fastening portions at a plurality of locations on the pair of plates; inserting an inner fin which forms separate flow paths for fluid between the pair of plates; assembling one flat tube by caulk fastening the pair of plates together by means of the caulk fastening portions with the inner fins being inserted; putting many flat tubes and corrugated fins together alternately in a stacked state; and brazing the flat tubes and the corrugated fins in a stacked state in a furnace so as to join them together.

With the second aspect of the method in accordance with the present invention, the flat tube is assembled by caulk fastening the pair of plates by means of the caulk fastening portions with the inner fins for forming the flow paths of fluid being inserted, and then the flat tubes and the corrugated fins are put together alternately. Therefore, the flow of fluid is smooth, and the flow path area can be increased. In addition, the assembly accuracy of the flat tubes is improved, and the assembly time of the stacked heat exchanger can be shortened. As a result, the reliability of the flat tube can be improved and the leakage of fluid can be prevented.

BRIEF DESCRIPTION OF THE DRAWINGS

FIG. 16 is a cross-sectional view taken along the line A—A of FIG. 1;

FIG. 20 is an expanded cross-sectional view of the right side portion of FIG. 19;

FIG. 21 is a front view of a plate forming a flat tube;

FIG. 22 is a cross-sectional view taken along the line D—D in FIG. 21; and

DETAILED DESCRIPTION OF THE PREFERRED EMBODIMENTS

Figure 1:
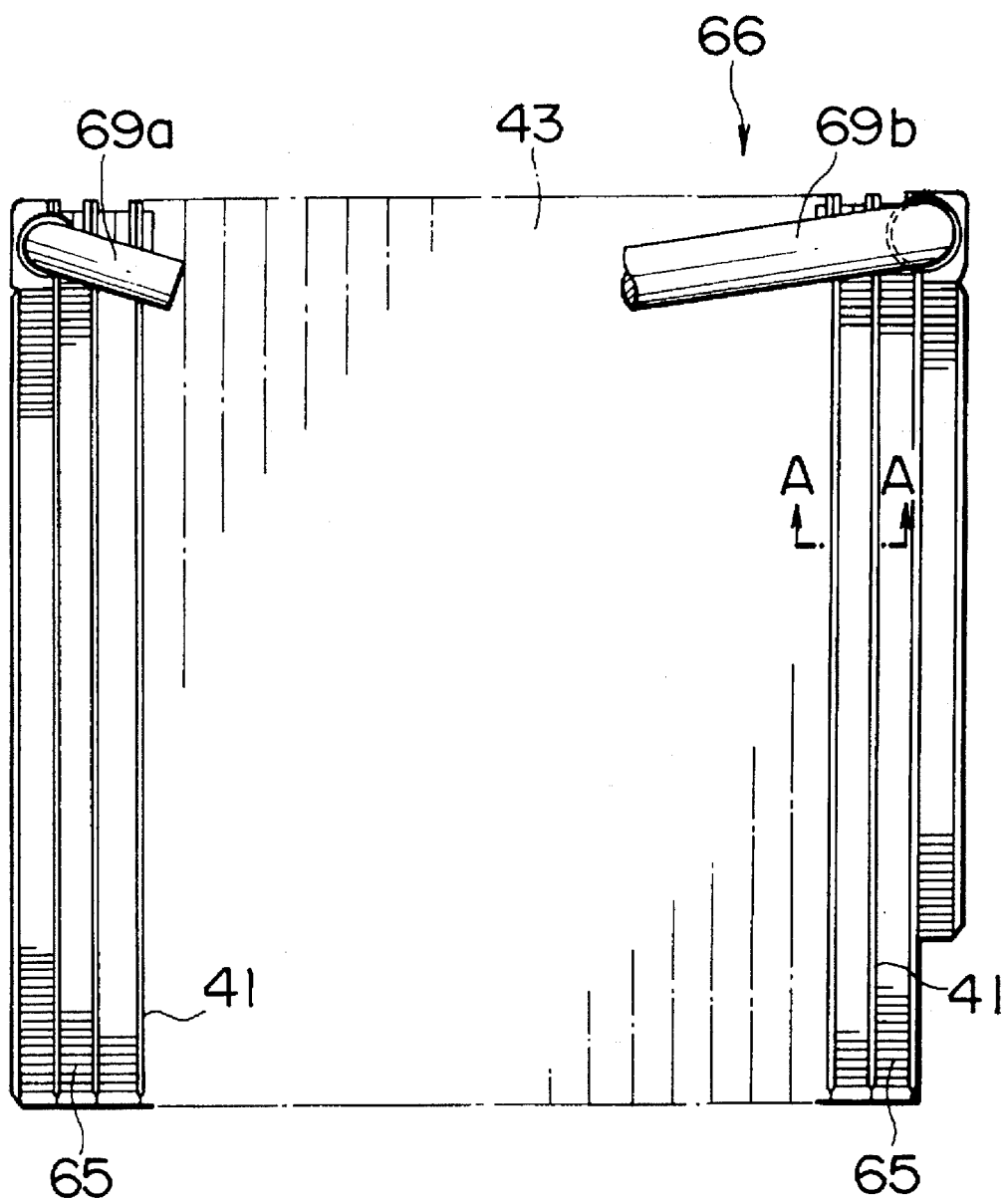
FIG. 1 is a side view of a stacked heat exchanger in accordance with one embodiment of the present invention.
Figure 2:
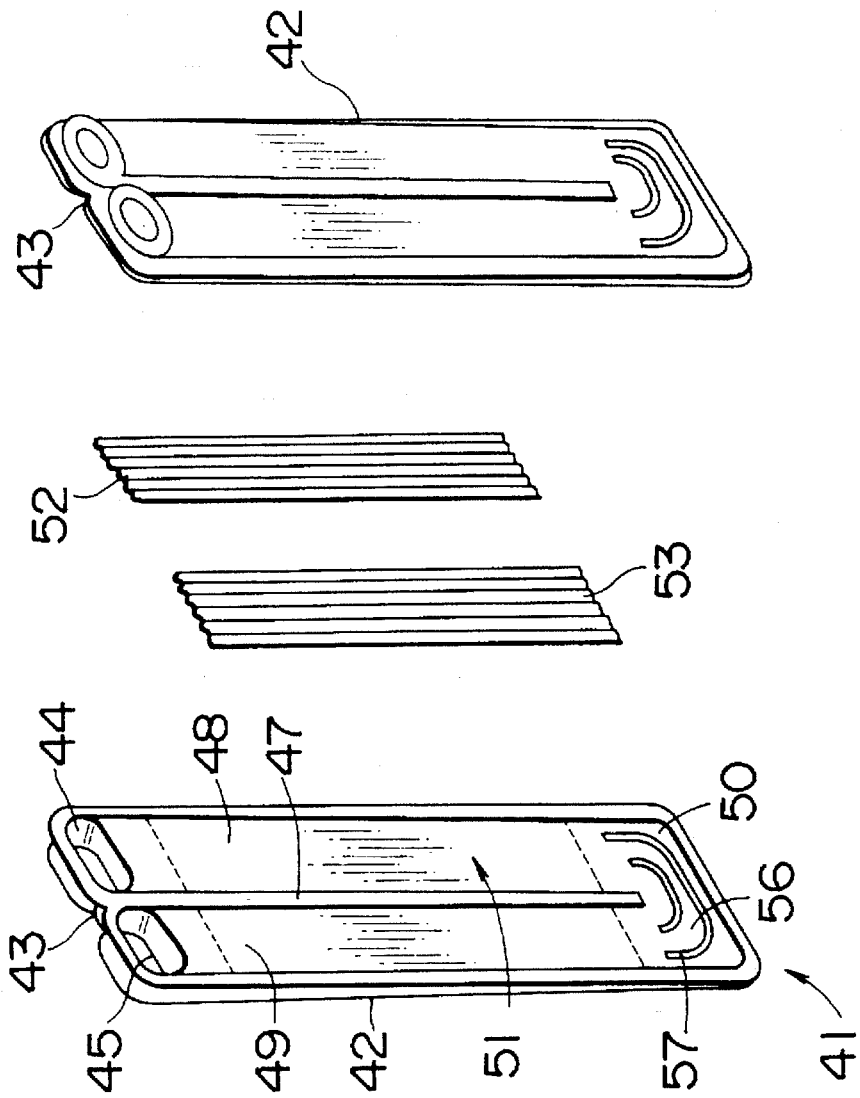
FIG. 2 is an exploded perspective view of a flat tube for a stacked heat exchanger in accordance with one embodiment of the present invention.
Figure 3:
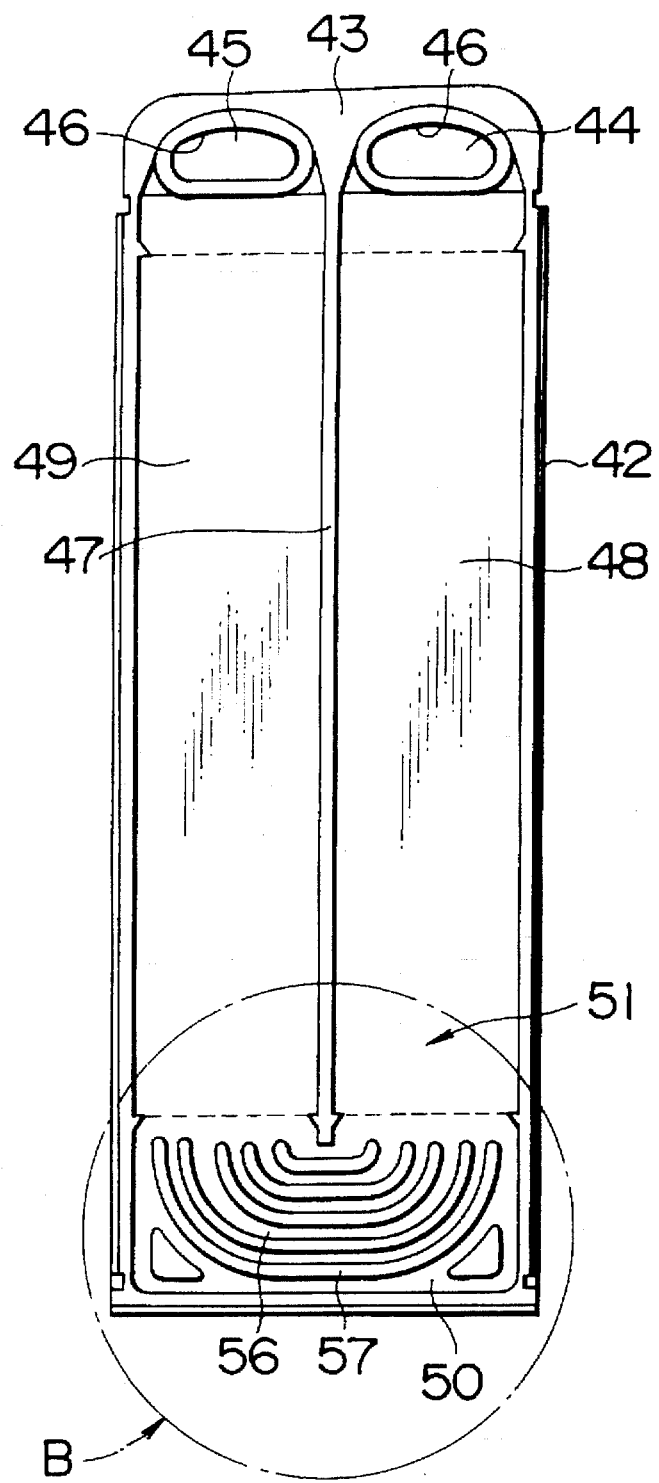
FIG. 3 is a front view showing the joining face of a plate forming a flat tube.
Figure 4:
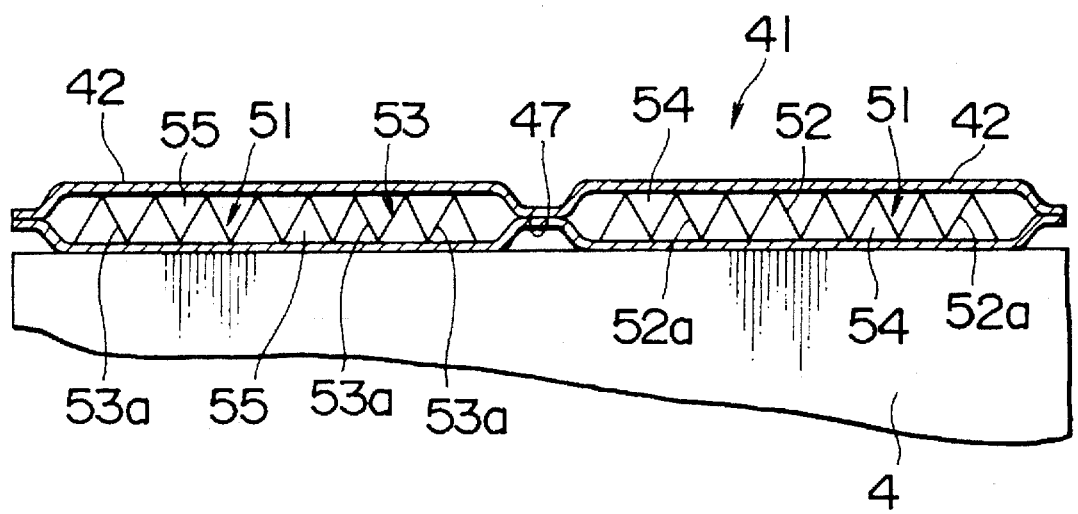
FIG. 4 is a transverse cross-sectional view of a flat tube.

FIG. 1 is a side view of a stacked heat exchanger in accordance with one embodiment of the present invention. FIG. 2 is an exploded perspective view of a flat tube for a stacked heat exchanger in accordance with one embodiment of the present invention. FIG. 3 is a front view showing the joining face of a plate forming a flat tube. FIG. 4 is a transverse cross-sectional view of a flat tube.

As shown in FIG. 2, a flat tube 41 is formed by butting two press-formed plates 42 together. An inlet/outlet tank portion 43 is formed at one end (upper end in the figure) of the flat tube 41.

As shown in FIG. 1, a stacked heat exchanger (evaporator) 66 is constructed by alternately putting flat tubes 41 and corrugated fins 65 together and connecting the inlet/outlet tanks 43. In FIG. 1, reference numeral 69a denotes an inlet pipe of a refrigerant, and 69b is an outlet pipe for refrigerant. The inlet/outlet tank portion 43 is partitioned into an inlet portion 44 and an outlet portion 45 in the plate width direction of the flat tube 41. When the evaporator is constructed, the inlet portions 44 of the adjacent inlet/outlet tank portion, as well as the outlet portions 45 thereof, communicate with each other through communicating holes 46.

The hollow portion of the plate 42 is divided into two chambers 48 and 49 by a partition 47 extending vertically at the center. The lower end portion of the partition 47 is cut short, so that a U-turn portion 50 can be formed at the lower end of the plate 42 for allowing the U-turn of refrigerant. By butting two plates 42 together, the inlet/outlet tank portion 43 is divided into the inlet portion 44 and the outlet portion 45 by the partition 47, and at the same time the flat tube is divided into the chamber 48 communicating with the inlet portion 44 and the chamber 49 communicating with the outlet portion 45. Further, the chamber 48 communicates with the chamber 49 at the U-turn portion 50. Thus, the chambers 48 and 49 and the U-turn portion 50 constitute a fluid passage 51.

Corrugated inner fins 52 and 53 are inserted in the straight portion of the chamber 48 and 49 of the fluid passage 51, respectively. The corrugated inner fins 52, 53 have a plurality of corrugations 52a, 53a formed along the lengthwise direction so that a plurality of separate flow paths 54, 55 are formed along the lengthwise direction (vertical direction) of the chamber 48, 49.

At the U-turn portion 50 of the fluid passage 51, a plurality of separate U-shaped flow paths 56 are formed to guide the U-turn of refrigerant. The U-shaped flow paths 56 are formed by a plurality of U-shaped beads 57 press-formed on the butt face of the plate 42. The U-shaped flow paths 56 are of a U shape which follows the shape of the plate 42.

When refrigerant flows in the chambers 48 and 49, the refrigerant flowing in the outside portion of the flow paths 54, 55 in the width direction of the flat tube 41 flows in the outside portion of the U-shaped flow paths 56 at the U-turn portion. On the other hand, the refrigerant flowing the inside portion of the flow paths in the width direction of the flat tube 41 flows in the outside portion of the U-shaped flow paths 56 at the U-turn portion. That is to say, the refrigerant in the flat tube 41 flows in the fluid passage through either an inside-to-inside or outside-to-outside path.

Figure 23:
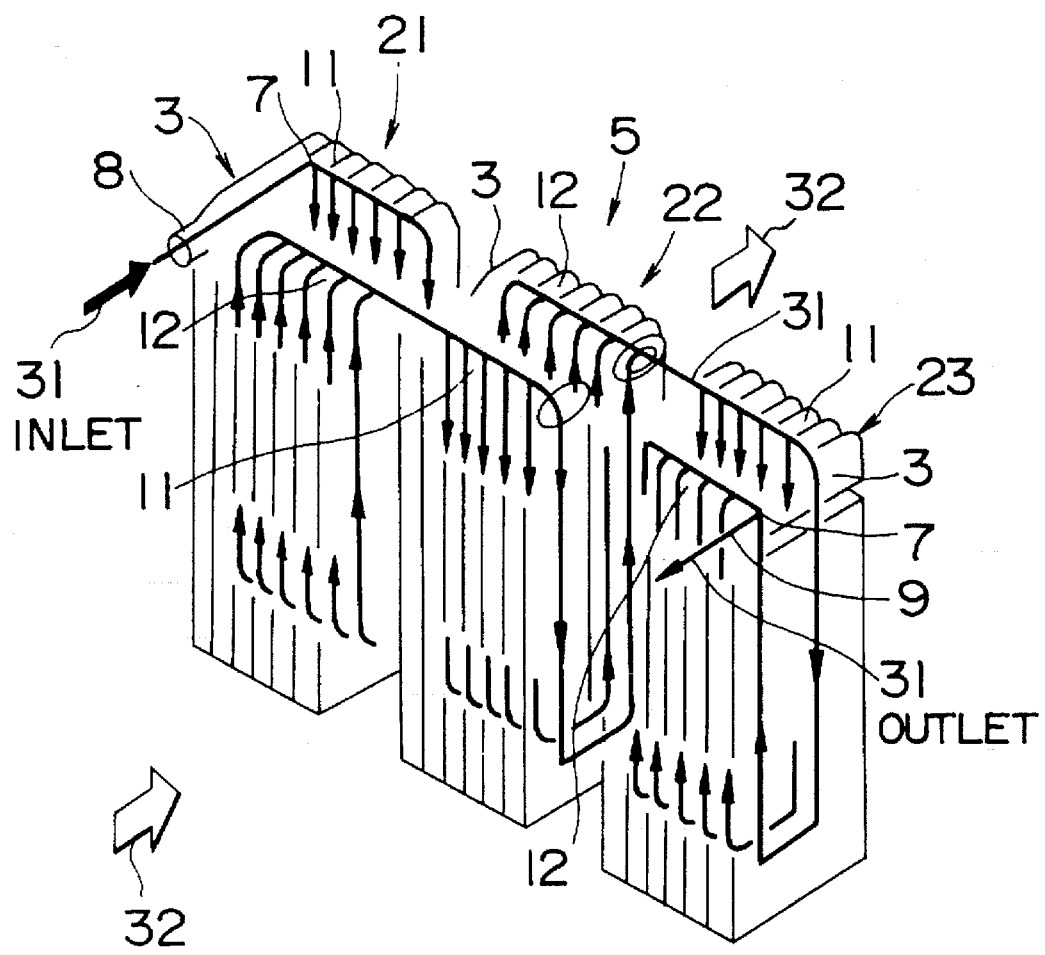
FIG. 23 is a view illustrating the flow of refrigerant in a conventional stacked heat exchanger.

In the above-described flat tube 41, the refrigerant entering the inlet portion 44 passes through the flow paths 54 separated by the corrugated inner fin 52 and is conducted to the U-turn portion 50, where it makes a U-turn by means of the U-shaped flow paths 56 separated by the u-shaped bead 57. Then, the refrigerant flows to the outlet portion 45 after passing through the flow paths 55 separated by the corrugated inner fin 53. An example of the flow of refrigerant and air in the entire evaporator in which flat tubes and corrugated fins are alternately stacked together according to the present invention is the same as shown in FIG. 23.

The refrigerant flowing in the flat tube 41 flows in the separate flow paths 54 and 55 and the U-shaped flow paths 56, so that the refrigerant flows in the fluid passage 51 from inside to inside and from outside to outside. Therefore, the separation of refrigerant into the gas and liquid phases due to the centrifugal force at the U-turn portion 50 occurs only in the U-shaped flow paths 56, thereby the distribution of the gas and liquid phases of the refrigerant can be decreased and becomes more contained. Also, since the U-shaped flow paths 56 at the U-turn portion 50 are of a U shape which follows or complies with the shape of the plate 42, no stagnation occurs in the flow of refrigerant.

Therefore, the decrease in thermal efficiency due to deviation is less likely to occur because of the decrease in distribution of the gas and liquid phases of the refrigerant, and significantly nonuniform heat exchange does not occur because of the lack of stagnation in the flow of refrigerant.

Figure 5:
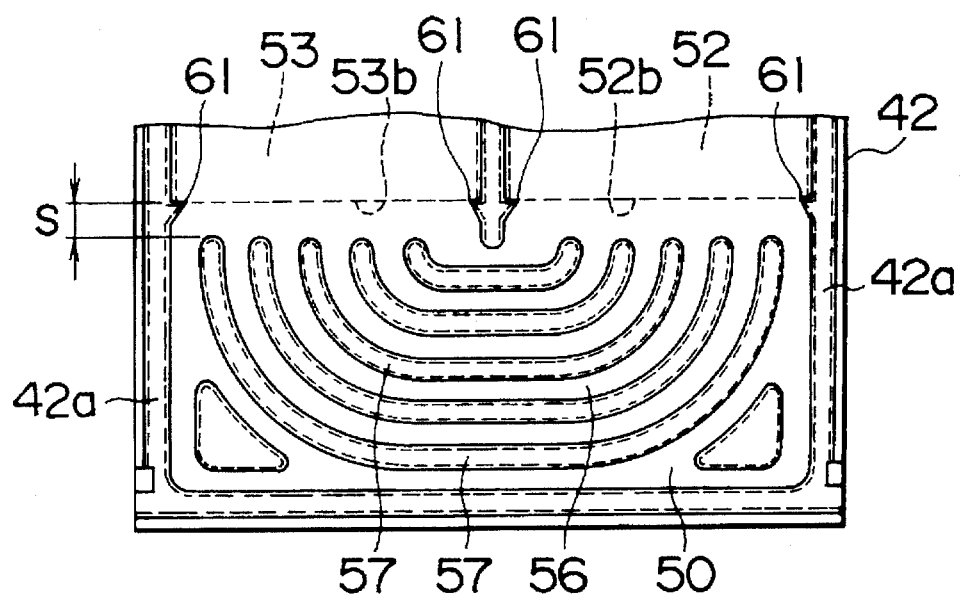
FIG. 5 is an expanded view of portion B in FIG. 3.

As shown in FIG. 5, which is an expanded view of portion B in FIG. 3, protrusions 61 are formed at the joint edges 42a of the plate 42 and on the U-turn 50 side of the partition 47. These protrusions 61 determine the positions of the corrugated inner fins 52 and 53 in the chambers 48 and 49, so that the positions of the lower edges 52b and 53b of the corrugated inner fins 52 and 53 with respect to the upper end position of the U-shaped flow paths 56 (U-shaped bead 57) are restrained.

The gap S between the upper end position of the U-shaped flow paths 56 and the lower edges 52b, 53b of the corrugated inner fins 52, 53 is set at 0.5 mm to 5 mm. If the gap S is less than 0.5 mm, it is difficult for the refrigerant passing through the flow paths 54 and 55 to flow through, if they coincide with the U-shaped bead 57 forming the U-shaped flow paths 56 because the pitch of the flow paths 54, 55 formed by the corrugated inner fins 52, 53 differs from the pitch of the U-shaped flow paths 56. If the gap S is more than 5 mm, non-brazed portions increase when the plate 42 is joined together by brazing, thereby the compressive strength becoming insufficient.

Figure 6:
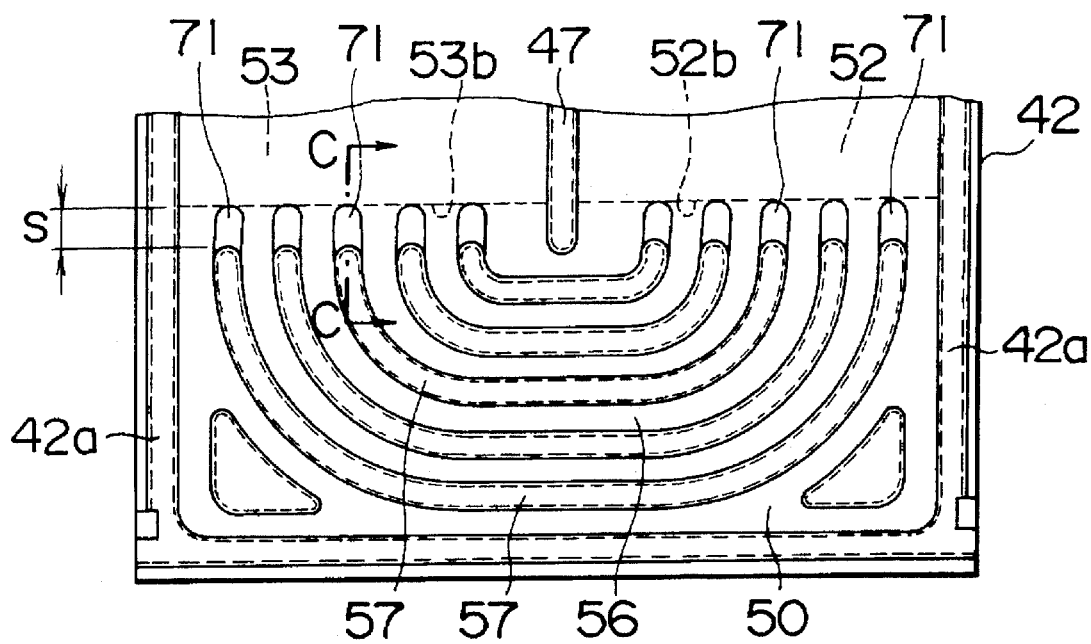
FIG. 6 is a front view of a plate showing the U-turn portion where protrusions are formed.
Figure 7:
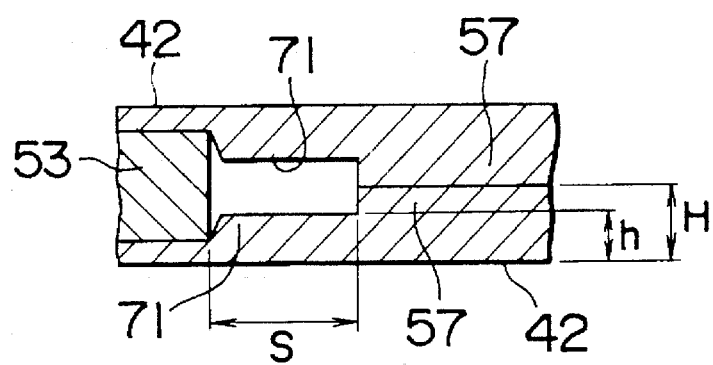
FIG. 7 is a cross-sectional view taken along the line C—C of FIG. 6.

Another embodiment of the protrusions for positioning will be described with reference to FIGS. 6 and 7. FIG. 6 is a front view of a plate showing the U-turn portion at which protrusions are formed, and FIG. 7 is a cross-sectional view taken along the line C—C of FIG. 6.

At the upper end of the U-shaped beads 57, a protrusion 71 is press-formed integrally with the U-shaped beads 57. The height h of the protrusion 71 is less than the height H of the U-shaped bead 57, so that a gap S is formed, as described above, between the upper ends of the U-shaped flow paths 56 when the lower end 53b (52b) of the corrugated inner fin 53 (52) is brought into contact with the ends of the protrusions.

Since the protrusions 61 or protrusions 71 are installed on the plate 42 in the chambers 48 and 49 (straight portion), the positioning of the corrugated inner fins 52 and 53 can be performed in the chambers 48 and 49 so that the inner fins 52 and 53 can be mounted in place in the flat tube 41. Therefore, the flow of refrigerant is not interrupted between the flow paths 54, 55 formed by the corrugated inner fins 52, 53 and the U-shaped flow paths 56, and moreover the non-brazed portions become small when the plates 42 are joined together by brazing.

Figure 8:
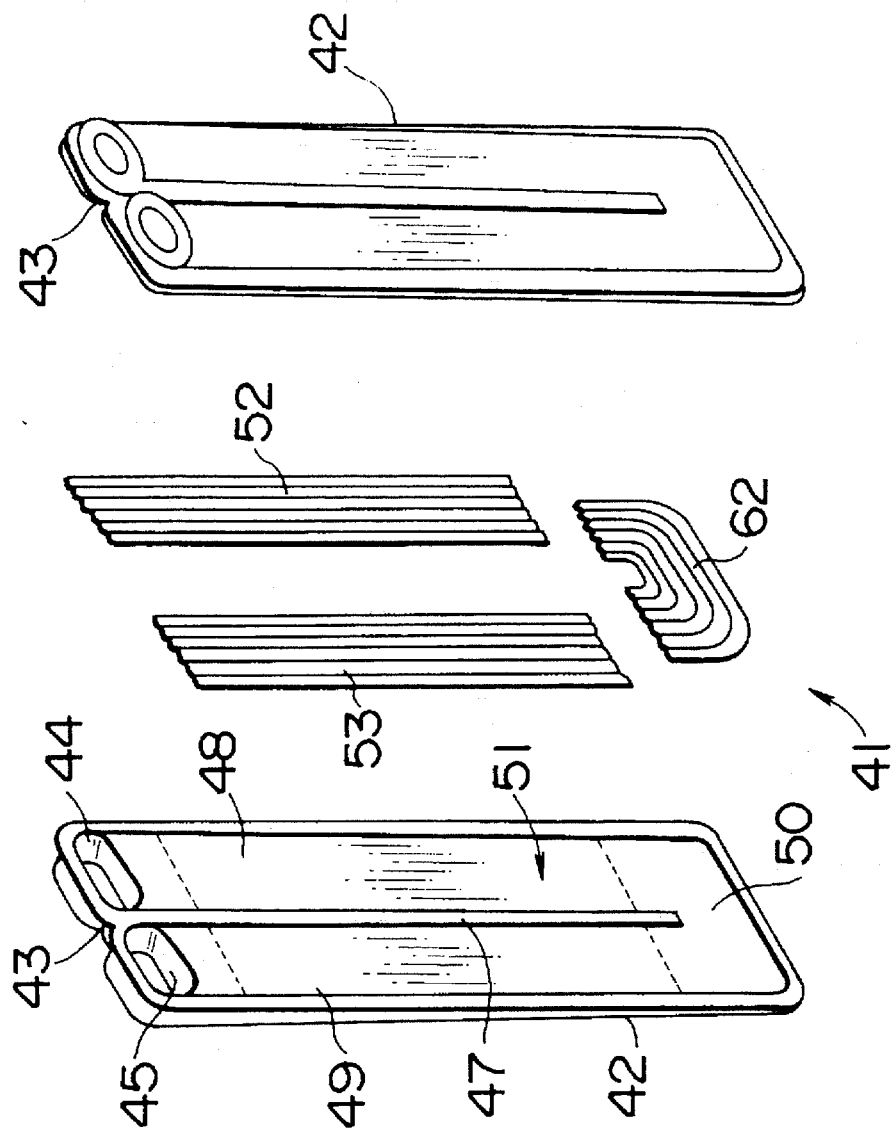
FIG. 8 is an exploded perspective view of a flat tube using U-shaped corrugated inner fins.
Figure 9:
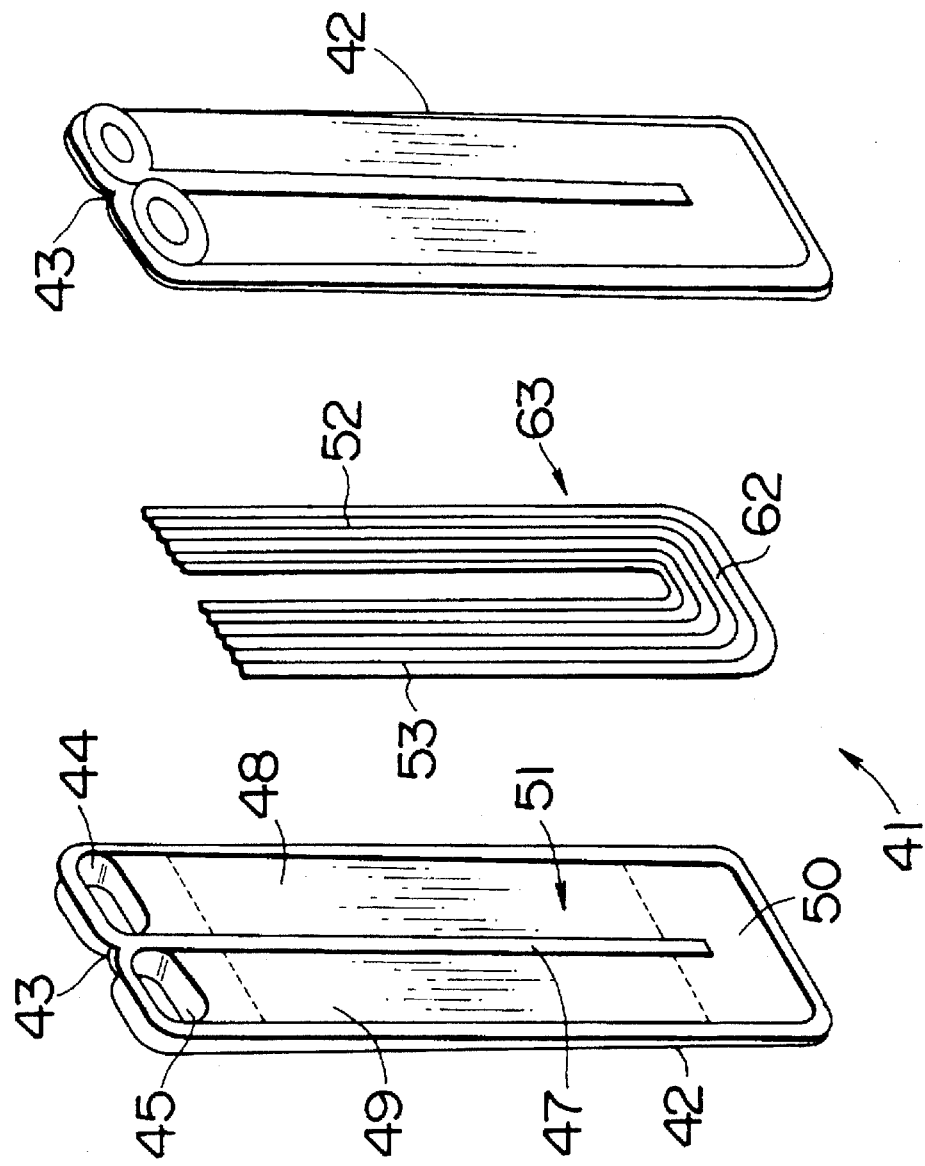
FIG. 9 is an exploded perspective view of a flat tube using an integrated inner fin.

Another embodiment of a flat tube is described with reference to FIGS. 8 and 9. FIG. 8 is an exploded perspective view of a flat tube using a U-shaped corrugated inner fin as well as straight corrugated inner fins, and FIG. 9 is an exploded perspective view of a flat tube using an integral inner fin.

As shown in FIG. 8, a continuous U-shaped corrugated inner fin 62 which would form a plurality of separate and continuous U-shaped flow paths is inserted in the U-turn portion 50. The insertion of the U-shaped corrugated inner fin 62 forms the U-shaped flow path. The corrugation pitch of the U-shaped corrugated inner fin 62 coincides with the pitch of the corrugations 52a and 53a of the corrugated inner fins 52 and 53.

Since the U-shaped flow paths at the U-turn portion 50 are formed by the U-shaped corrugated inner fin 62, the flow path area including the U-turn portion 50 can be increased, and the U-shaped flow paths at the U-turn portion 50 can be finely divided as with the flow paths 54 and 55 in the chamber 48 and 49, thereby the distribution of the gas and liquid phases of the refrigerant is decreased or contained. Thus, the flow of the refrigerant in the fluid passage 51 can be closely controlled, thereby heat transfer property being improved.

In the U-shaped corrugated inner fin 62, though continuous U-shaped flow paths are formed by the U-shaped corrugation, the U-shaped flow paths may also be formed by combining a plurality of straight corrugations.

Referring to FIG. 9, one inner fin 63 which is formed by combining the corrugated inner fins 52 and 53 and the U-shaped corrugated inner fin 62 together is inserted in the chambers 48 and 49 and the U-turn portion 50 of the plate 42. By inserting the inner fin 63, the flow paths 54 and 55 and the U-shaped flow paths are formed continuously.

Since the flow paths 54 and 55 and the U-shaped flow paths are continuously divided by a single inner fin 62, the flow paths of refrigerant in the flat tube become continuous, so that a uniform flow of refrigerant is achieved, and the heat exchange becomes uniform. Further, this configuration decreases the number of parts, thereby the cost is reduced.

The inner fin 63 is provided with a groove into which the partition 47 between the corrugated inner fins 52 and 53 can be inserted. However, one approximately rectangular inner fin can be formed by making the corrugated fins 52 and 53 continuous and putting the corrugated fin between the joint portions of the partitions 47. This configuration is easy to shape.

In the above-described flat tube, the separate and lengthwise flow paths 54 and 55 in the chambers 48 and 49 are formed by the corrugated inner fins 52 and 53, so that the flow of the refrigerant becomes smooth, and the flow path area is increased. Since a plurality of separate U-shaped flow paths are formed at the U-turn portion 50, no stagnation occurs in flow of the refrigerant, and the separation of the refrigerant into the gas and liquid phases due to centrifugal forces at the U-turn portion 50 occurs only within each U-shaped flow path 56, thereby the distribution of the gas and liquid phases of the two-phase refrigerant can be decreased.

Since the U-shaped flow paths at the U-turn portion 50 are formed by inserting the U-shaped corrugated inner fin 62, the U-shaped flow paths can be finely divided, so that the flow of the refrigerant can be controlled closely over the entire fluid passage 51.

Also, since the fluid passage 51 consisting of the chambers 48 and 49 and the U-turn portion 50 is continuously formed by one inner fin 63, the flow paths of refrigerant become continuous, thereby the flow becomes uniform.

Figure 10:
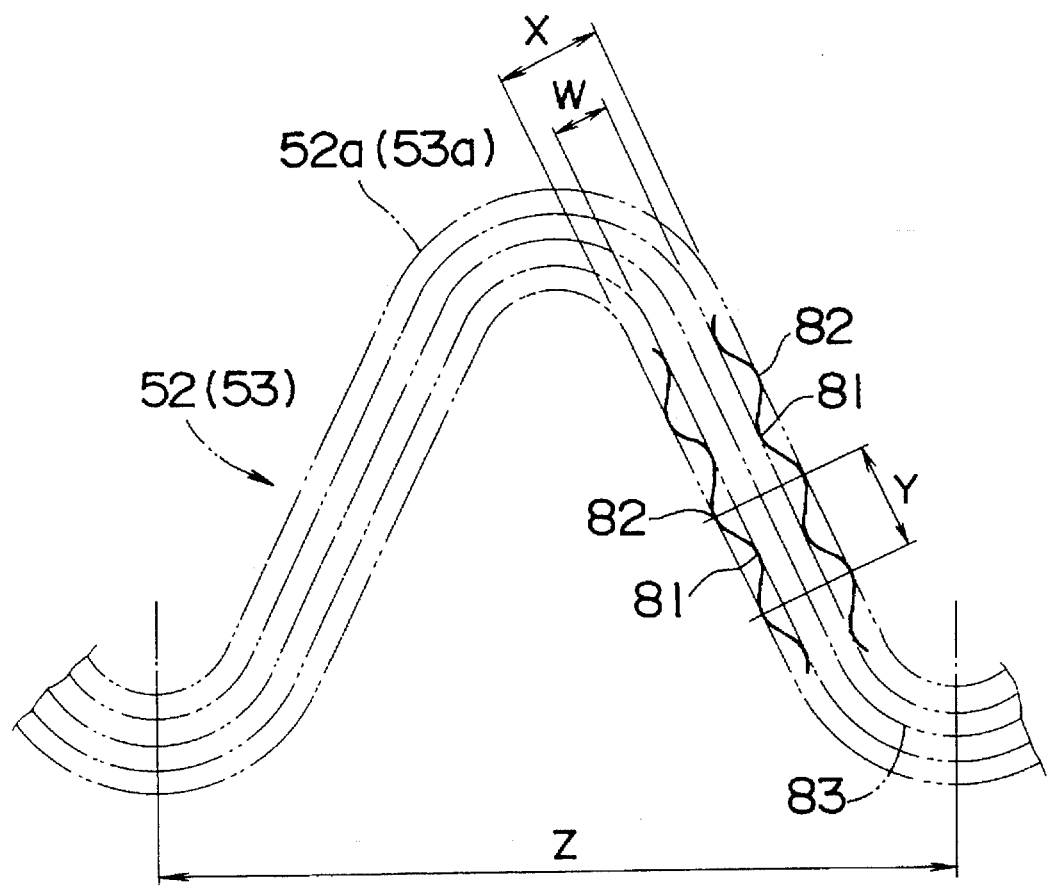
FIG. 10 is an expanded view of a corrugated inner fin in FIG. 4.

The corrugated inner fin 52 (53) will be described in detail with reference to FIG. 10. FIG. 10 is an expanded cross-sectional view of the corrugated inner fin 52 (53) shown in FIG. 2.

The corrugated fin 52 (53) is formed of a blank sheet with a thickness of 0.23 mm. On the inside and outside surfaces of the corrugated inner fin 52 (53), concaves 81 and convexes 82 are formed by embossing. The concaves 81 and the convexes 82 are symmetrical on the inside and outside surfaces with respect to the center of thickness 83.

The thickness W at the concave 81 is 0.15 mm, while the thickness X at the convex 82 is 0.28 mm; the thickness X at convex 82 is 1.87 times the thickness W at the concave 81 (X/W=1.87). The pitch Y of the convexes 82 is 0.3 mm, which is 1.3 times the thickness of the blank sheet used for the manufacture of the corrugated inner fin 52 (53).

The thickness of the blank sheet for the corrugated inner fin 52 (53) may be between 0.15 mm and 0.3 mm, and the ratio X/W may be between 1.5 and 2.5. The pitch Y of the convexes or concaves may be 1 to 2.5 times the blank sheet thickness and is not limited to the value indicated in the above embodiment.

The pitch Z of the corrugations 52a (53a) of the corrugated inner fin 52 (53) is 2.4 mm, which is 9.74 times the thickness of the blank sheet. The pitch Z may be 6 to 16 times the blank sheet thickness.

If the thickness of the blank sheet, the shape and thickness of convex and concave, the thickness ratio of X/W, and the pitch Y of the convexes or concaves of the corrugated inner fin 52 (53) are set to the above values, a sheet having high heat transfer property is provided while the strength of the corrugated inner fin 52 (53) is maintained, and the surface area can be increased.

If the pitch Z of the corrugations 52a (53a) of the corrugated inner fin 52 (53) is set to the above value, a sufficient compressive strength is ensured when the plates 42 are joined to form the flat tube 41.

By setting the shape and dimensions of the corrugated inner fin 52 (53) as shown in FIG. 10, the surface area can be increased with no cracks or fractures forming during fabrication even though the fin is a thin sheet, and the heat transfer property can be improved while maintaining the strength. Further, by setting the pitch Z of the corrugations 52a (53a) of the corrugated inner fin 52 (53) as indicated above, the compressive strength of the flat tube 41 is ensured.

Figure 11:
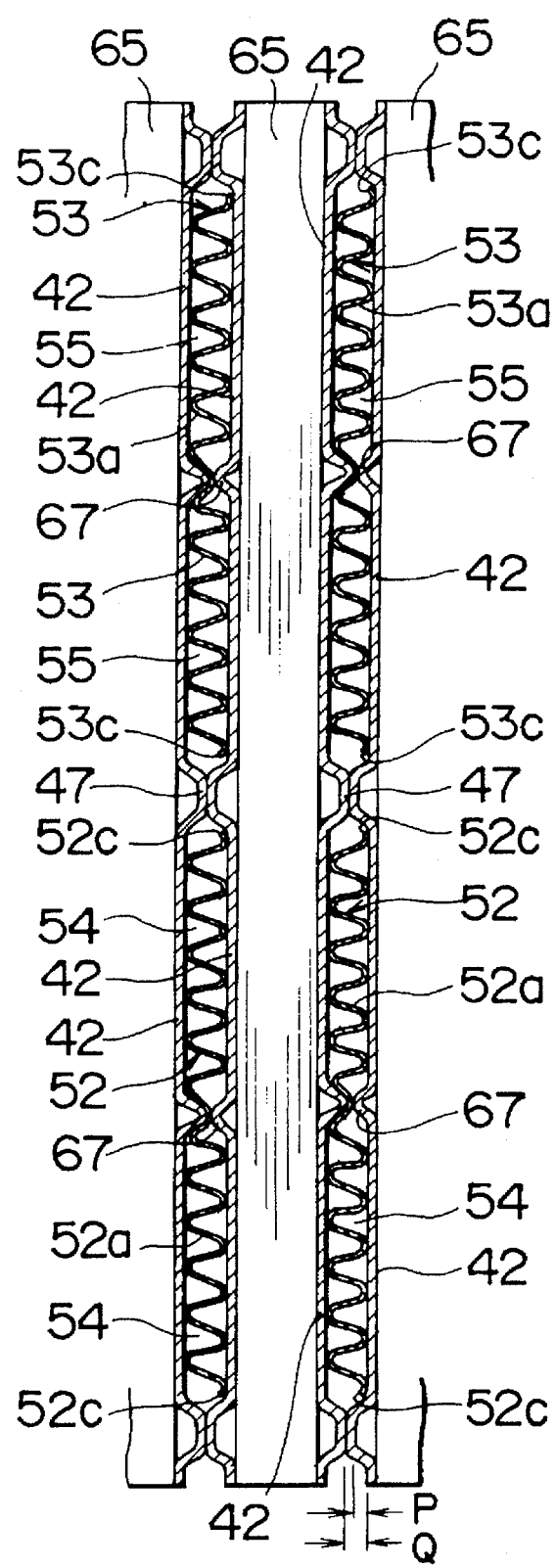
FIG. 11 is a cross-sectional view taken along the line A—A of FIG. 1.

Another embodiment of the flat tube 41 will be described with reference to FIG. 11. FIG. 11 is a view corresponding to the cross-sectional view taken along the line A—A of FIG. 1.

In the chambers 48 and 49, protruding walls 67 are formed extending in parallel to the partition 47 and form grooves on the outside of the plate 42. When two plates 42 are butted, the corrugated inner fins 52, 53 are mounted so that the central portion of the inner fins 52, 53 is placed between the protruding walls 67 as shown in FIG. 11.

By forming grooves on the outside of the plate 42 by means of the protruding wall 67, the outside surface of the flat tube 41 is provided with a groove formed by the partition 47 and grooves formed by the protruding walls 67. These grooves help condensed water flow down on the outer surface of the flat tubes and prevent water dew from splashing.

As shown in FIG. 11, the height P of the edge portion 52c, 53c of the corrugated inner fins 52, 53 is smaller than the press-formed depth Q of the chamber 48, 49 forming portion of the plate 42. Therefore, when two plates 42 are butted with the corrugated inner fins 52, 53 being disposed in the chamber 48, 49, the edge portions 52c, 53c of the corrugated inner fins 52, 53 are not put between the joint edges 42a of the plates 42. Also, the corrugated inner fins 52, 53 are not shifted because the edge portions 52c, 53c of the corrugated inner fins 52, 53 are not pushed by the joint edge 42a of the plate 42.

Therefore, by using these corrugated inner fins 52, 53, the corrugated inner fins 52, 53 can be installed reliably and easily in place in the chambers 48, 49 formed by two plates 42.

Figure 12:
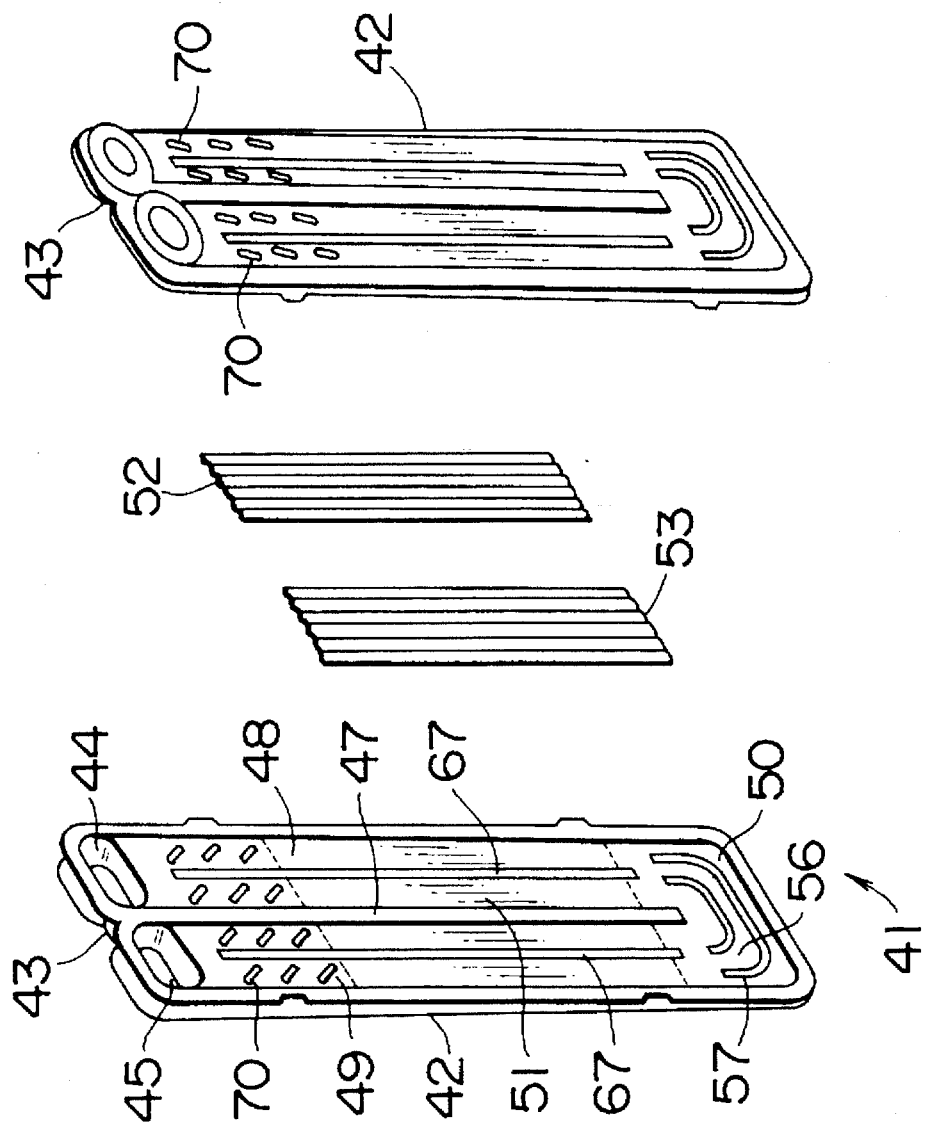
FIG. 12 is an exploded perspective view of a flat tube for a stacked heat exchanger in accordance with one embodiment of the present invention.
Figure 13:
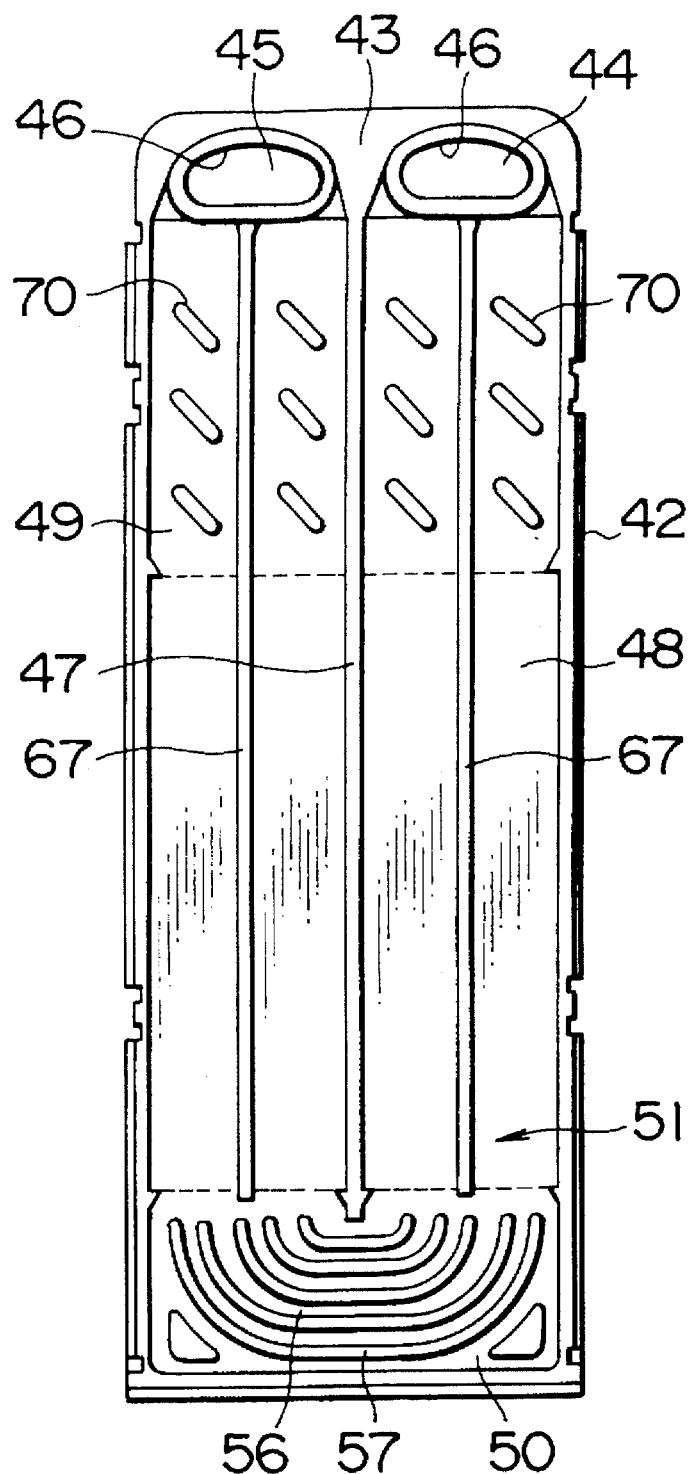
FIG. 13 is a front view showing the joining face of a plate forming a flat tube.
Figures 14A, 14B:
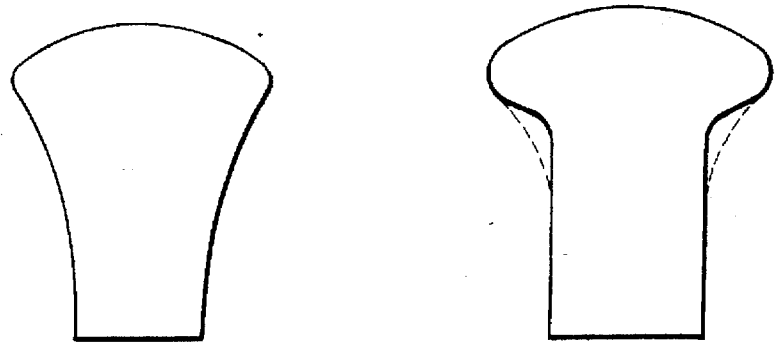
FIGS. 14(a) and (b) illustrate the comparison of deformation mode between the present invention and a conventional example.

FIGS. 12 through 14 show another embodiment of the flat tube 41. As shown in the figures, the vertical length of the corrugated inner fins 52, 53 is shorter than the vertical length of the chambers 48, 49 so that the corrugated inner fins 52, 53 are not inserted at the portion of a quarter of the chamber length on the inlet/outlet tank portion 43 side of the chambers 48, 49.

At the portions where the corrugated inner fins 52, 53 are not inserted, many dimples 70 which provide concaves on the outside of the plate are formed. These dimples are butted to each other between the plates.

In the chambers 48 and 49, formed are protruding walls 67 which extend in parallel to the partition 47, and form grooves on the outside of the plate 42. When two plates 42 are butted, the corrugated inner fins 52, 53 are mounted so that the central portion of the inner fins 52, 53 comes between the protruding walls 67 as shown in FIG. 11.

By providing the above-described flat tube, high strength is assured in the core portion 51 by the insertion of the corrugated inner fins 52, 53, while allowing smooth deformation on the inlet/outlet tank portion 43 side of the flat tube under repeated pressurization by the formation of dimples 70. As seen from the deformation mode shown in FIG. 14, in the case of the conventional example which uses dimples only, the entirety of the flat tube is deformed considerably. This is certainly undesirable. In the present invention, because of the combination of dimples 70 and the corrugated inner fins 52, 53, the concerned portion is smoothly deformed because the structural rigidity at a portion of the flat tube close to the inlet/outlet tank portion 43 is slightly weakened because dimples 70 there do not provide the same rigidity as the corrugated inner fins 52, 53 (refer to the broken line in FIG. 14). Therefore, the flat tube can sufficiently withstand the compressive deformation. Incidentally, the solid line in the figure shows the deformation mode in the case where the corrugated inner fins are inserted throughout the total vertical length of the chambers 48, 49. This deformation mode may be undesirable because the deformation occurs suddenly at the inlet/outlet tank portion 43.

Figure 15:
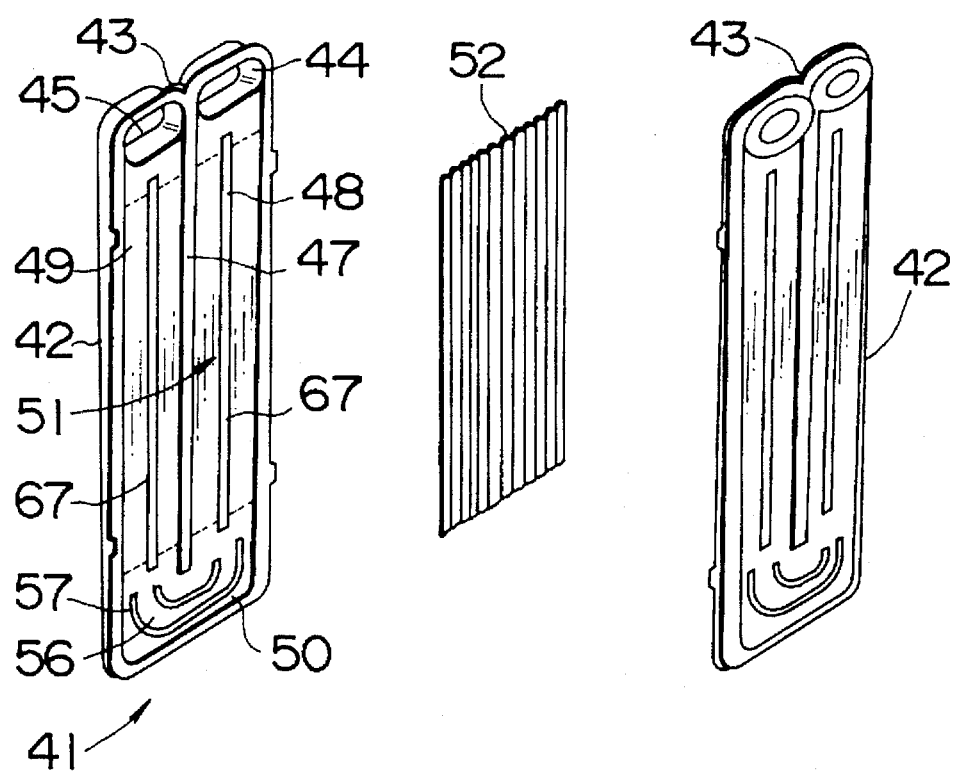
FIG. 15 is an exploded perspective view of a flat tube.

As shown in FIGS. 15 and 16, the flat tube 41 is provided with one corrugated inner fin 52 inserted in the chambers 48 and 49 (straight flow path) of the fluid passage 51. As shown in FIG. 16, the corrugated inner fin 52 has a plurality of corrugations 52a formed along the lengthwise direction so that a plurality of flow separate paths 54 are formed along the lengthwise direction (vertical direction in the figure) of the chambers 48 and 49.

In the chambers 48 and 49, formed are protruding walls 67 which extend in parallel to the partition 47, and which form grooves on the outside of the plate 42. When two plates 42 are butted, the corrugated inner fin 52 is mounted so that the central portion of the inner fin comes between the protruding walls 67 as shown in FIG. 16.

Since one corrugated inner fin 52 forms a plurality of separate flow paths 54, the flow of refrigerant is made smooth by a small number of parts, and the area of the flow paths can be increased.

Figure 17:
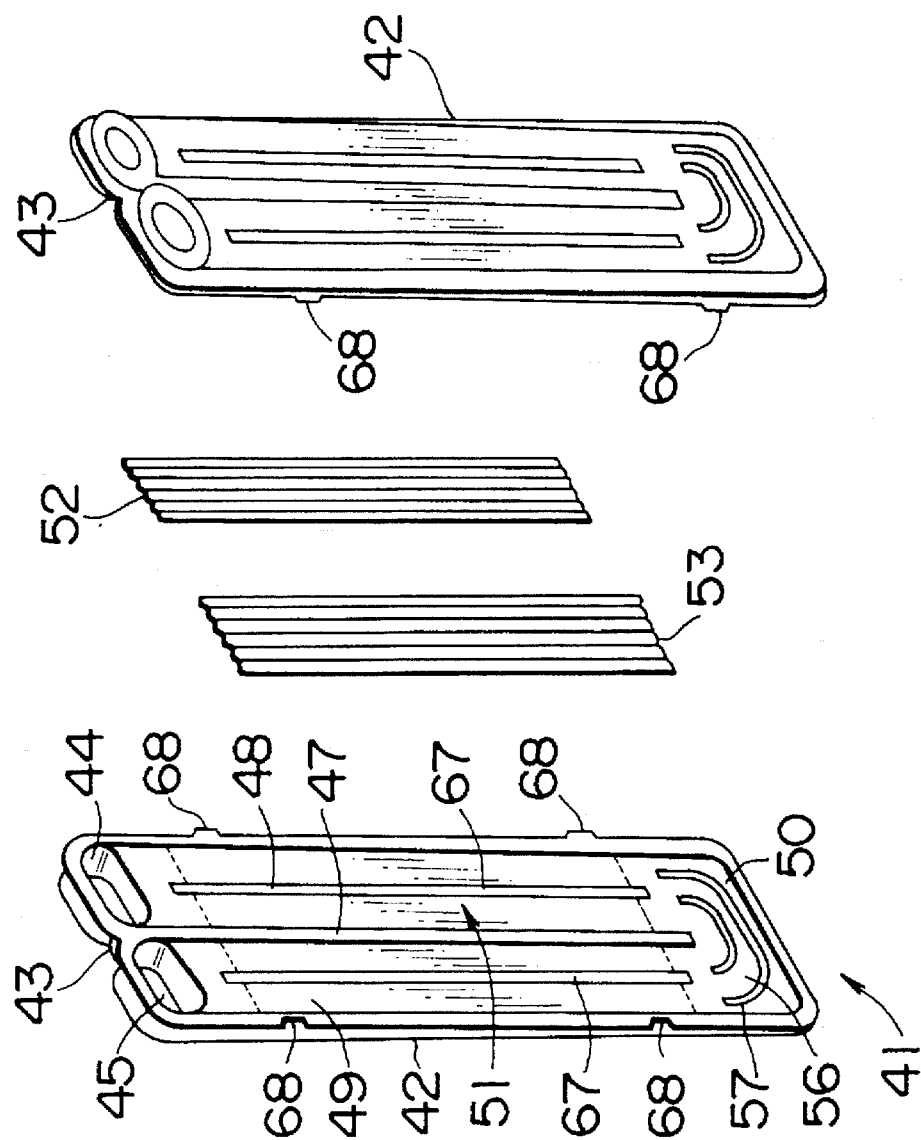
FIG. 17 is an exploded perspective view of a flat tube for a stacked heat exchanger manufactured by a method in accordance with one embodiment of the present invention.

Next, a method of manufacturing the above-described stacked heat exchanger will be described. FIG. 17 is an exploded perspective view of a flat tube for a stacked heat exchanger manufactured by the method in accordance with one embodiment of the present invention, and FIG. 18 is a front view showing the joining face of a plate forming a flat tube.

Figure 18:
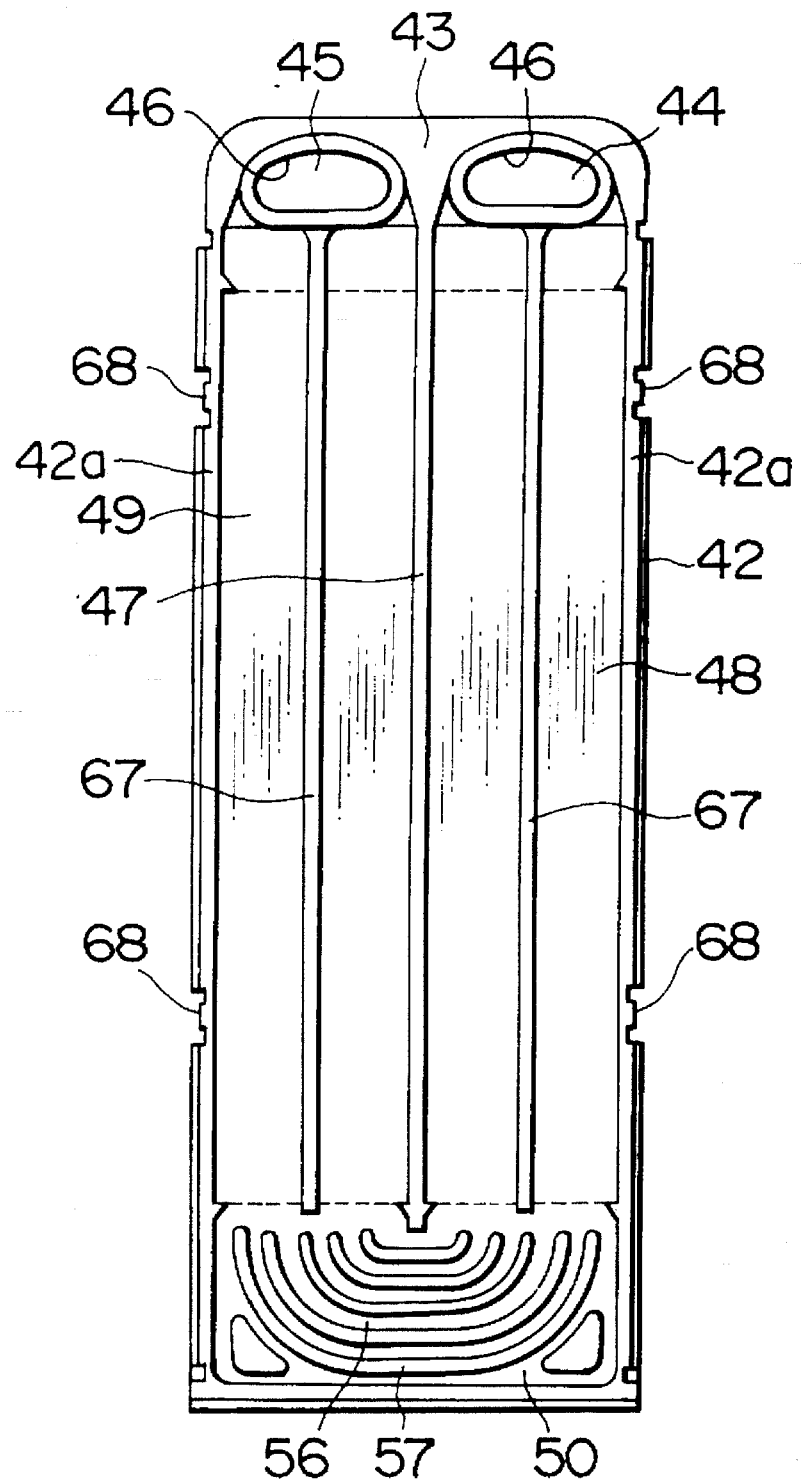
FIG. 18 is a front view showing the joining face of a plate forming a flat tube.
Figure 19:
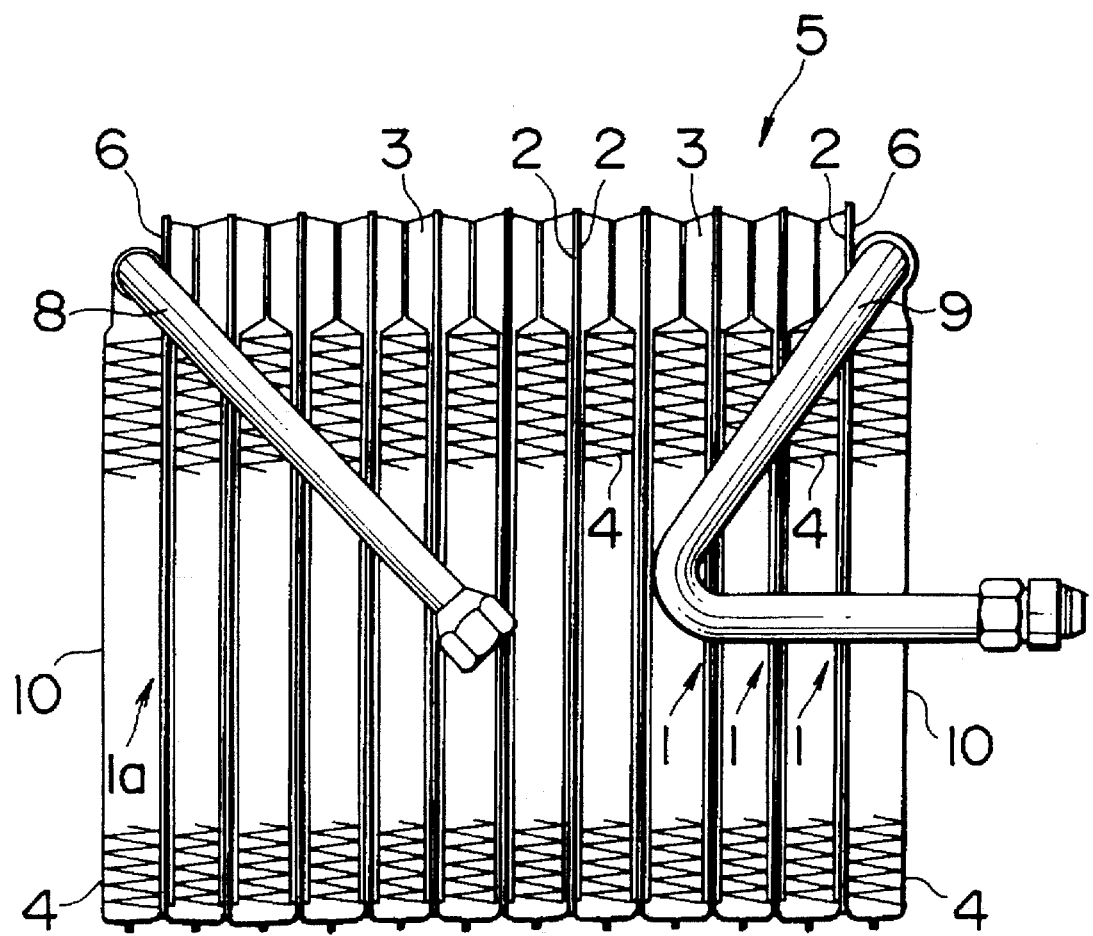
FIG. 19 is a side view of a conventional stacked heat exchanger.

As shown in FIG. 18, caulk fastening portions 68 are disposed at four places of the joint edges 42a of the plate 42. The corrugated inner fins 52 and 53 are installed in the chambers 48 and 49 which are formed by two plates 42. Then, the plates 42 are butted and caulk fastened at the caulk fastening portions 68. Thus, a flat tube 41 into which corrugated inner fins 52 and 53 are inserted is assembled as a subassembly.

Using the flat tube 41 of the above construction, a method of manufacturing an evaporator 66 in accordance with one embodiment of the present invention will be described. The corrugated inner fins 52 and 53 are installed in the chambers 48 and 49 which are formed by two plates 42, and the plates 42 are butted and caulk fastened at the caulk fastening portions 68 to assemble the flat tube 41. Then, the assembled flat tubes 41 and the corrugated fins 65 are alternately stacked for assembly, and they are brazed in a furnace to produce the evaporator 66.

In the evaporator 66 manufactured by the above-described method, the flat tube 41 can be produced with high reliability because the flat tube 41 is subassembled in advance, thereby the leakage of refrigerant can be prevented.

The above-described manufacturing method for the evaporator 66 has been explained by using a flat tube 41 having the corrugated inner fins 52 and 53 interposed between the plates 42. However, in the case where an evaporator is manufactured using flat tubes constituting the flow paths 54 and 55 without the corrugated inner fins 52 and 53, the evaporator can be manufactured by producing the flat tube as a subassembly.

We claim:

1. A method of manufacturing a stacked heat exchanger comprising flat tubes and corrugated fins which are alternately put together, wherein each said flat tube is formed by butting two press-formed plates, has an inlet/outlet tank portion formed at one end thereof, and has a fluid passage formed therein for guiding a fluid flowing between said two plates from an inlet tank portion to an outlet tank portion by allowing a U-turn at the other end portion of said flat tube, comprising the steps of disposing caulk fastening portions at a plurality of places on said pair of plates; assembling each flat tube by caulk fastening said pair of plates by means of said caulk fastening portions; putting a plurality of flat tubes and corrugated fins together alternately in a stacked state; and brazing said flat tubes and said corrugated fins in said stacked state in a furnace.

2. A method of manufacturing a stacked heat exchanger comprising flat tubes and corrugated fins which are alternately put together, wherein each said flat tube is formed by butting two press-formed plates, has an inlet/outlet tank portion formed at one end thereof, and has a fluid passage formed therein for guiding a fluid flowing between said two plates from an inlet tank portion to an outlet tank portion by allowing a U-turn at the other end portion of said flat tube, comprising the steps of disposing caulk fastening portions at a plurality of places on said pair of plates; inserting an inner fin which forms flow paths of fluid between said pair of plates; assembling said flat tube by caulk fastening said pair of plates by means of said caulk fastening portions with said inner fin being inserted; putting a plurality of said flat tubes and corrugated fins together alternately in a stacked state; and brazing said flat tubes and said corrugated fins in said stacked state in a furnace.

* * * * *